(12) United States Patent
Nilsson et al.

(10) Patent No.: US 8,447,307 B2
(45) Date of Patent: May 21, 2013

(54) HANDOVER FOR AN INTERMEDIATE NODE IN A WIRELESS COMMUNICATION NETWORK

(75) Inventors: Andreas Nilsson, Goteborg (SE); Henrik Asplund, Stockholm (SE); Mikael Coldrey, Landvetter (SE); Fredrik Gunnarsson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/396,838

(22) Filed: Feb. 15, 2012

(65) Prior Publication Data

US 2013/0102312 A1   Apr. 25, 2013

Related U.S. Application Data

(60) Provisional application No. 61/550,121, filed on Oct. 21, 2011.

(51) Int. Cl.
*H04W 36/00* (2009.01)

(52) U.S. Cl.
USPC ..... 455/436; 455/442; 455/432.1; 455/435.1; 455/422.1; 370/331

(58) Field of Classification Search ........ 455/436, 455/442, 432.1, 435.1, 422.1; 370/331
See application file for complete search history.

(56) References Cited

U.S. PATENT DOCUMENTS

| | | |
|---|---|---|
| 2006/0229076 A1 | 10/2006 | Monk |
| 2006/0239119 A1* | 10/2006 | Hartka et al. ............... 367/87 |
| 2008/0102813 A1 | 5/2008 | Chari et al. |
| 2008/0181174 A1 | 7/2008 | Cho |
| 2011/0212695 A1* | 9/2011 | Wild et al. ............... 455/73 |

FOREIGN PATENT DOCUMENTS

| | | |
|---|---|---|
| WO | 0131944 A1 | 5/2001 |
| WO | 2010022784 A1 | 3/2010 |

OTHER PUBLICATIONS

International Search Report and Written Opinion issued on Jun. 5, 2012 in International Application No. PCT/EP2012/052739, 11 pages.

* cited by examiner

*Primary Examiner* — Nghi H Ly
(74) *Attorney, Agent, or Firm* — Rothwell, Figg, Ernst & Manbeck, P.C.

(57) ABSTRACT

The disclosure relates to an intermediate node arranged to relay information between a donor node and at least one served node, and comprises a served antenna arrangement that communicates by means of at least a first and second electrically steerable antenna radiation lobe. During a first mode of operation, all antenna radiation lobes are directed towards a first donor node. During a second mode of operation, the antenna radiation lobes are directed such that the intermediate node is in contact with both the first donor node and the second donor node. During a third mode of operation, all antenna radiation lobes are directed towards the second donor node. A first polarization is associated with each lobe directed towards the second donor node during the second mode of operation and a second polarization is associated with each lobe directed towards the first donor node during the second mode of operation.

13 Claims, 7 Drawing Sheets

HANDOVER FOR AN INTERMEDIATE NODE IN A WIRELESS COMMUNICATION NETWORK

This application claims the benefit of U.S. Provisional Patent Application No. 61/550,121, filed on Oct. 21, 2011. The entirety of said application is incorporated by reference herein.

TECHNICAL FIELD

The present invention relates to an intermediate node in a wireless communication network. The intermediate node is arranged to relay information between a donor node and at least one served node, and comprises a served antenna arrangement that is adapted to communicate with each donor node by means of at least a first antenna radiation lobe and a second antenna radiation lobe. The antenna radiation lobes are electrically steerable such that during a first mode of operation, the served antenna arrangement is adapted to direct all antenna radiation lobes towards a first donor node. Furthermore, during a second mode of operation, following the first mode of operation, when the first donor node has been determined to be exchanged with a second donor node by means of handover, the served antenna arrangement is adapted to direct at least the first antenna radiation lobe towards the second donor node. Then the served antenna arrangement is also adapted to maintain at least the second antenna radiation lobe directed towards the first donor node such that, during the second mode of operation, the intermediate node is in contact with both the first donor node and the second donor node during hand-over procedures for the first donor node and the second donor node. Finally, during a third mode of operation, corresponding to the first mode of operation, the served antenna arrangement is adapted to direct all antenna radiation lobes towards the second donor node.

The present invention also relates to a method for changing a first donor node to a second donor node for an intermediate node in a wireless communication network. The intermediate node is used to relay information between donor nodes and at least one served node, the intermediate node communicating with each donor node by means of at least a first antenna radiation lobe and a second antenna radiation lobe. The antenna radiation lobes are electrically steerable. The method comprises the steps: (a) during a first mode of operation, directing all antenna radiation towards a first donor node; (b) during a second mode of operation, following the first mode of operation, when the first donor node is going to be exchanged with a second donor node by means of handover, directing at least the first antenna radiation lobe towards the second donor node. This step also comprises maintaining at least the second antenna radiation lobe directed towards the first donor node, such that, during the second mode of operation, the intermediate node is in contact with both the first donor node and the second donor node during handover procedures for the first donor node and the second donor node; and (c) during a third mode of operation, corresponding to the first mode of operation, directing all antenna radiation lobes towards the second donor node.

BACKGROUND

Repeaters and relays are efficient for both providing coverage in areas without coverage and also to provide increased data rates to areas with weak signal strength for example at cell edge and indoor. A repeater works in the physical layer and amplifies and forwards the signal, including present noise and interference. A relay typically decodes the data before amplifying and forwarding the signal, which means that interference and noise will not be forwarded.

Repeaters and relays are usually served by a base station called donor base station, and usually serve user terminals. If the antenna at the repeater or relay intended for communication with the donor base station is reconfigurable, for example by means of beam-forming, the donor base station could be changed by pointing the beam of the reconfigurable antenna from the current donor base station to another base station. The reason for doing this could for example be that the current donor base station is overloaded or breaks down.

Repeaters and relays that are placed on moving objects like for example trains or ships are called mobile relays. A mobile relays must change donor base station due to that the train and ships will move from one cell to another.

When using a reconfigurable antenna at repeaters or relays for changing the donor base station, some kind of handover is required. For a repeater, all the user terminals served by that repeater must make a handover from the current donor base station to the new donor base station. If the change of donor base station becomes too quick, all the user terminals will not have time required to do these handovers and connections will be dropped. For a relay, the user terminals that are served by that relay do not have to make handovers due to that they are connected to the relay regardless of which donor base station the relay got. That is, the donor base station is transparent to the user terminals since the relay acts like a base station. However, the relay itself has to make a handover from the current donor base station to the new donor base station.

US 2006229076 discloses a wireless communication terminal on a mobile platform, such as a train, that makes use of directional antennas able to accomplish soft handoffs between base transceiver stations. An antenna controller controls a beam-forming network to generate a first and a second lobe, the first lobe being directed towards a donor base station and the second lobe being used to continuously scan for one or more different base transceiver stations sites that may be available to form a higher quality link.

However, it is difficult to maintain coverage for the first lobe while having a desired flexibility with the second lobe. Furthermore, if the second lobe suddenly finds a different base transceiver station, there will be a lot of interference in the radio.

It is therefore a desire to provide a repeater or a relay with an improved handover when changing donor base station for relay and repeater compared with prior art.

SUMMARY

It is an object of the present invention to provide a repeater or a relay with an improved handover when changing donor base station for relay and repeater compared with prior art.

Said object is obtained by means of an intermediate node in a wireless communication network. The intermediate node is arranged to relay information between a donor node and at least one served node, and comprises a served antenna arrangement that is adapted to communicate with each donor node by means of at least a first antenna radiation lobe and a second antenna radiation lobe. The antenna radiation lobes are electrically steerable such that during a first mode of operation, the served antenna arrangement is adapted to direct all antenna radiation lobes towards a first donor node. Furthermore, during a second mode of operation, following the first mode of operation, when the first donor node has been determined to be exchanged with a second donor node by means of handover, the served antenna arrangement is adapted to direct at least the first antenna radiation lobe towards the second donor node. Then the served antenna arrangement is also adapted to maintain at least the second antenna radiation lobe directed towards the first donor node such that, during the second mode of operation, the intermediate node is in contact with both the first donor node and the second donor node during hand-over procedures for the first donor node and the second donor node. Finally, during a third mode of operation, corresponding to the first mode of operation, the served antenna arrangement is adapted to direct all antenna radiation lobes towards the second donor node. Furthermore, the served antenna arrangement is arranged to communicate by means of a first polarization and a second polarization. The first polarization is associated with each antenna radiation lobe directed towards the second donor node during the second mode of operation and the second polarization is associated with each antenna radiation lobe directed towards the first donor node during the second mode of operation.

Said object is obtained by means of a method for changing a first donor node to a second donor node for an intermediate node in a wireless communication network. The intermediate node is used to relay information between donor nodes and at least one served node, the intermediate node communicating with each donor node by means of at least a first antenna radiation lobe and a second antenna radiation lobe. The antenna radiation lobes are electrically steerable. The method comprises the steps: (a) during a first mode of operation, directing all antenna radiation towards a first donor node; (b) during a second mode of operation, following the first mode of operation, when the first donor node is going to be exchanged with a second donor node by means of handover, directing at least the first antenna radiation lobe towards the second donor node. This step also comprises maintaining at least the second antenna radiation lobe directed towards the first donor node, such that, during the second mode of operation, the intermediate node is in contact with both the first donor node and the second donor node during handover procedures for the first donor node and the second donor node; and (c) during a third mode of operation, corresponding to the first mode of operation, directing all antenna radiation lobes towards the second donor node.

Furthermore, the method also comprises the step of communicating by means of a first polarization and a second polarization. The first polarization is associated with each antenna radiation lobe directed towards the second donor node during the second mode of operation and the second polarization is associated with each antenna radiation lobe directed towards the first donor node during the second mode of operation.

According to an example, the intermediate node is a repeater or a relay.

According to another example, the served node is constituted by at least one user terminal.

According to another example, the intermediate node is arranged to evaluate whether there is a suitable second donor node. When performing said evaluation, the intermediate node may take antenna gains into account.

Other examples are disclosed in the dependent claims.

The main advantage of the invention is that handovers could more easily be made when changing donor base station for an intermediate node such as a relay or a repeater. This will lead to fewer dropped calls and disconnections. It also enables load sharing actions where an intermediate node is enforced to change donor base station. By maintaining the received signal strength of both a serving donor node and a candidate donor node within a threshold for a sufficiently long time, it is possible to have time to complete all handovers of all user terminals served by the intermediate node. This means that the user terminals have time to perform a correct and complete handover.

Furthermore, in case of the intermediate node being constituted by a relay, the prolonged handover time enables the more complicated relay handover to be completed satisfactory. The prolonged handover time is also helpful for idle user terminals reselecting cells during these handover times.

BRIEF DESCRIPTION OF THE DRAWINGS

The present invention will now be described more in detail with reference to the appended drawings, where.

DETAILED DESCRIPTION

The third generation partnership project (3GPP) is currently working on standardization of the Long Term Evolution (LTE) concept. LTE can be used as an exemplifying radio access technology. However, these embodiments are essentially equally applicable to other radio access technologies as well.

In the following, since the description will be directed to a repeater or a relay, the term intermediate node will be used for these or similar devices. Furthermore, handover procedures for different radio access technologies are regarded as commonly known, and their details will not be further discussed here.

Figure 1:
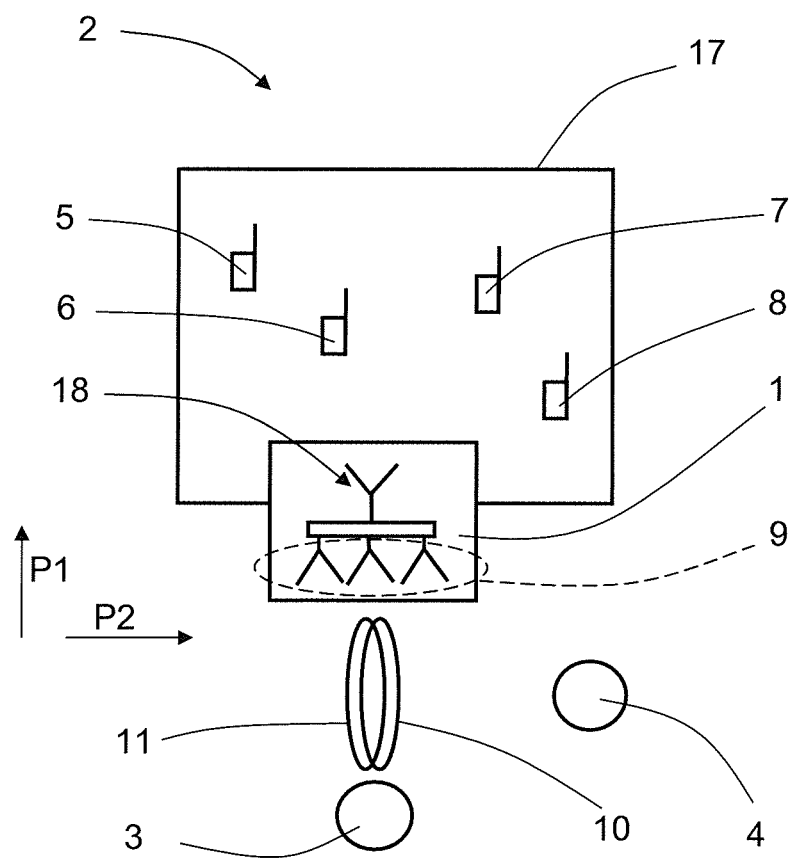
FIG. 1 schematically shows a repeater/relay mounted to a building in a first mode of operation.

With reference to FIG. 1, showing a first example, there is a building 17 at which there is an intermediate node 1 which is comprised in a wireless communication network 2. The intermediate node 1 is arranged to relay information between a first donor node 3 and four served nodes in the form of user terminals 5, 6, 7, 8 in the building 17. The first donor node 3 then functions as a serving donor node.

The intermediate node 1 comprises a served antenna arrangement 9 that is adapted to communicate with the first donor node 3 by means of a first antenna radiation lobe 10 and a second antenna radiation lobe 11, where the antenna radiation lobes 10, 11 are electrically steerable. The served antenna arrangement 9 is for example constituted by a reconfigurable antenna.

The intermediate node further comprises a serving antenna arrangement 18 which is used for communication between the intermediate node 1 and the user terminals 5, 6, 7, 8. The serving antenna arrangement 18 may be of any suitable type, either having one or more fixed and/or steerable antenna radiation lobes.

During a first mode of operation, as shown in FIG. 1, the served antenna arrangement 9 is adapted to direct the antenna radiation lobes 10, 11 of the served antenna arrangement 9 towards the first donor node 3, such that communication between the intermediate node 1 and the first donor node 3 takes place by means of both antenna radiation lobes 10, 11.

Figure 2:
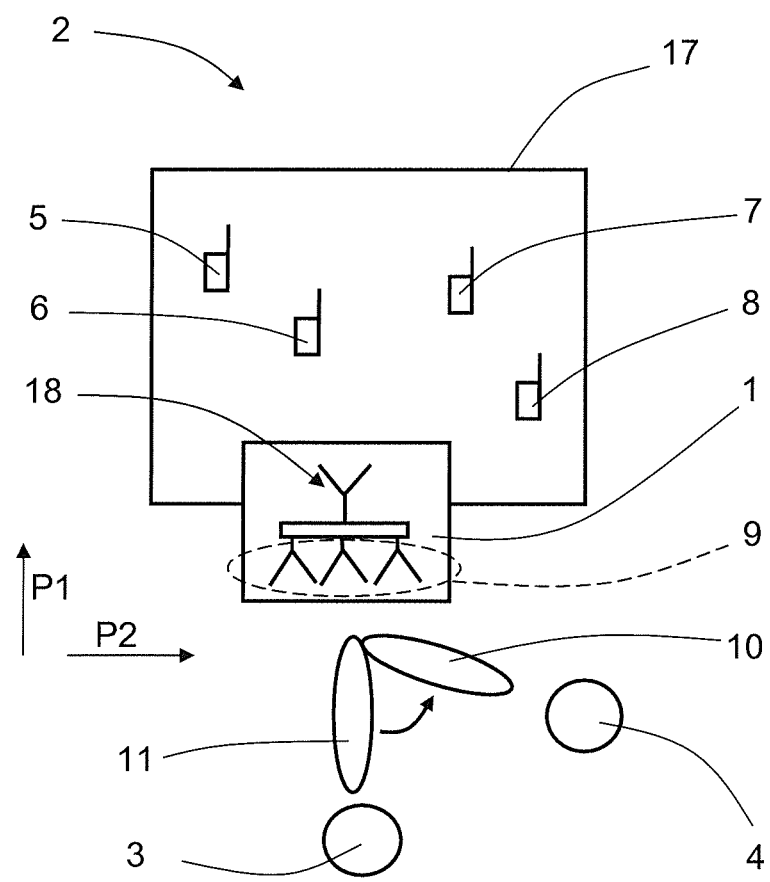
FIG. 2 schematically shows a repeater/relay mounted to a building in at the start of a second mode of operation.
Figure 3:
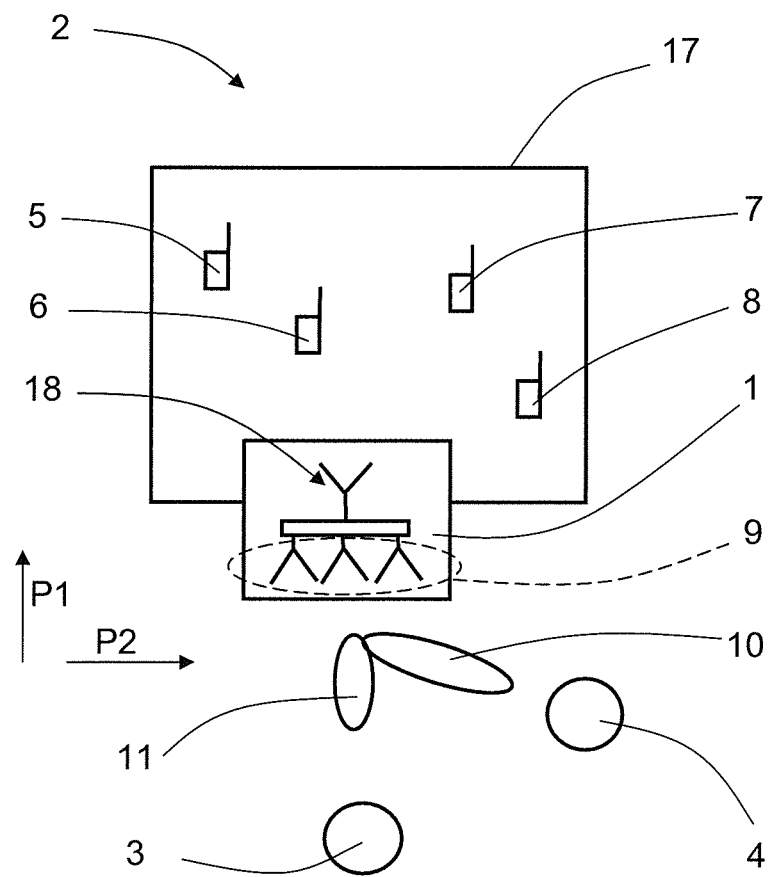
FIG. 3 schematically shows a repeater/relay mounted to a building in a second mode of operation.

During a second mode of operation, following the first mode of operation, the first donor node 3 has been determined to be exchanged with a second donor node 4 by means of handover. Then, as shown in FIG. 2 and FIG. 3, the served antenna arrangement 9 is adapted to direct the first antenna radiation lobe 10 towards the second donor node 4 and to maintain the second antenna radiation lobe 11 directed towards the first donor node 3. In this way, during the second mode of operation, the intermediate node 1 is in contact with both the first donor node 3 and the second donor node 4 during hand-over procedures for the first donor node 3 and the second donor node 4. The wireless communication network 2 performs the hand-over procedures in a previously known way which is depending on which radio system that is used, where the hand-over is facilitated by means of the intermediate node 1 being in contact with both the first donor node 3 and the second donor node 4 during hand-over procedures.

In the case of the intermediate node 1 being constituted by a relay, the hand-over from one donor node to the next donor node for the relay is facilitated, and in the case of the intermediate node 1 being constituted by a repeater, the hand-over from one donor node to the next donor node for the user terminals 5, 6, 7, 8 is facilitated.

Figure 4:
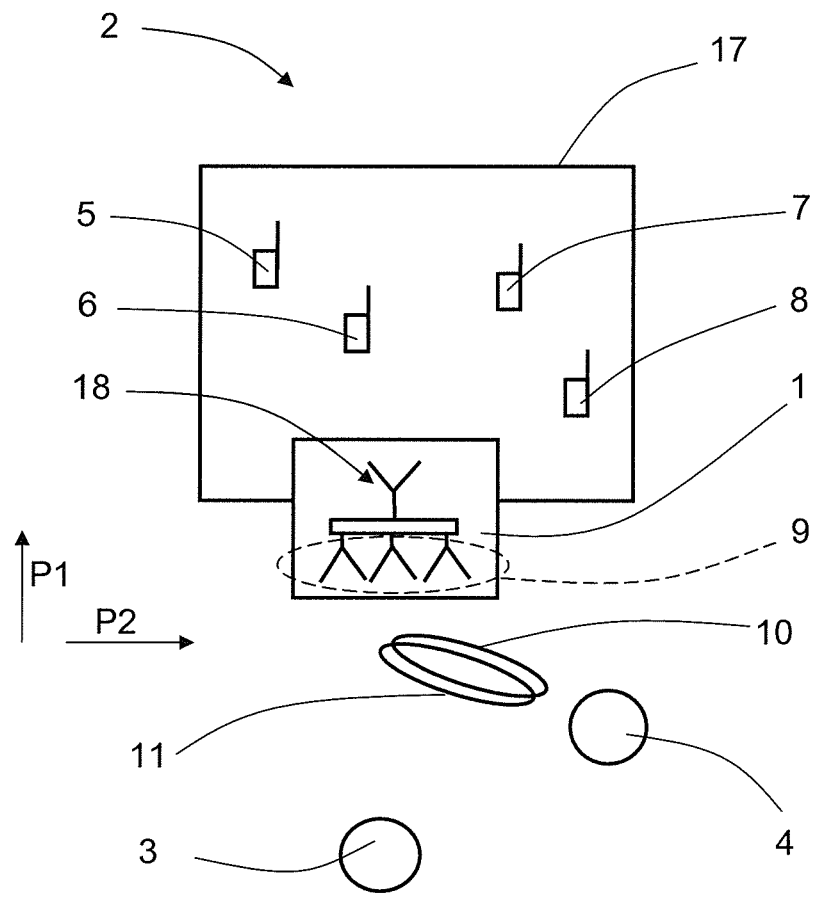
FIG. 4 schematically shows a repeater/relay mounted to a building in a third mode of operation.

During a third mode of operation, as shown in FIG. 4, the served antenna arrangement 9 is adapted to direct both antenna radiation lobes 10, 11 towards the second donor node. Here, the hand-over procedures have terminated, the third mode of operation corresponding to the first mode of operation.

The donor nodes 3, 4 may be in the form of base stations, where the first donor node is constituted by a serving base station in the first mode of operation, and the second donor node is constituted by a candidate base station which in the third mode of operation, after handover completion, has been converted into a serving base station. The serving base station is positioned in a serving cell, and the candidate base station is positioned in a candidate cell.

According to the present invention, the served antenna arrangement 9 is arranged for communicating by means of a first polarization P1 and a second polarization P2. The first polarization P1 is associated with the first antenna radiation lobe 10, and the second polarization P2 is associated with the second antenna radiation lobe 11.

In the following, a more detailed version of the first example will be described. According to this version, the intermediate node 1 is constituted by an outdoor-to-indoor repeater with a reconfigurable antenna 9, and the first donor node 3 is constituted by a first donor base station, which at this stage is the current donor base station for the repeater 1. For example, the first donor base station 3 is overloaded due to too much traffic, and it would be better for the repeater 1 to change donor base station to the second donor node 4 which is constituted by a second donor base station 4, and which at this stage is constituted by a chosen candidate base station.

If the antenna radiation lobes 10, 11 of both polarizations of the reconfigurable antenna 9 at the repeater 1 instantly would be directed towards the second donor node 4, the user terminals 5, 6, 7, 8 served by the repeater 1 would not have enough time to do handovers from the first donor base station 3 to the second donor base station, 4 and calls would be dropped.

Instead, first the first antenna radiation lobe 10 of the first polarization P1 of the reconfigurable antenna 9 is be directed towards the second donor base station 4, as shown in FIG. 2 and FIG. 3. Then it is possible for the user terminals 5, 6, 7, 8 served by the repeater 1 to do handovers from the first donor base station 3 to the second donor base station 4. However, the user terminals 5, 6, 7, 8 will typically connect to the base station that gives the user terminals 5, 6, 7, 8 the best signals; therefore it might be necessary to reduce the power of the first antenna radiation lobe 10, as can be seen in FIG. 3.

It is also possible that the first donor base station 3, when the antenna reconfiguration is completed, initiates the handover procedure towards the user terminals 5, 6, 7, 8. When the user terminals 5, 6, 7, 8 have made their handovers from the first donor base station 3 to the second donor base station 4, also the second antenna radiation lobe 11 of the second polarization P2 of the reconfigurable antenna 9 is directed towards the second donor base station 4 as can be seen in FIG. 4.

Figure 5:
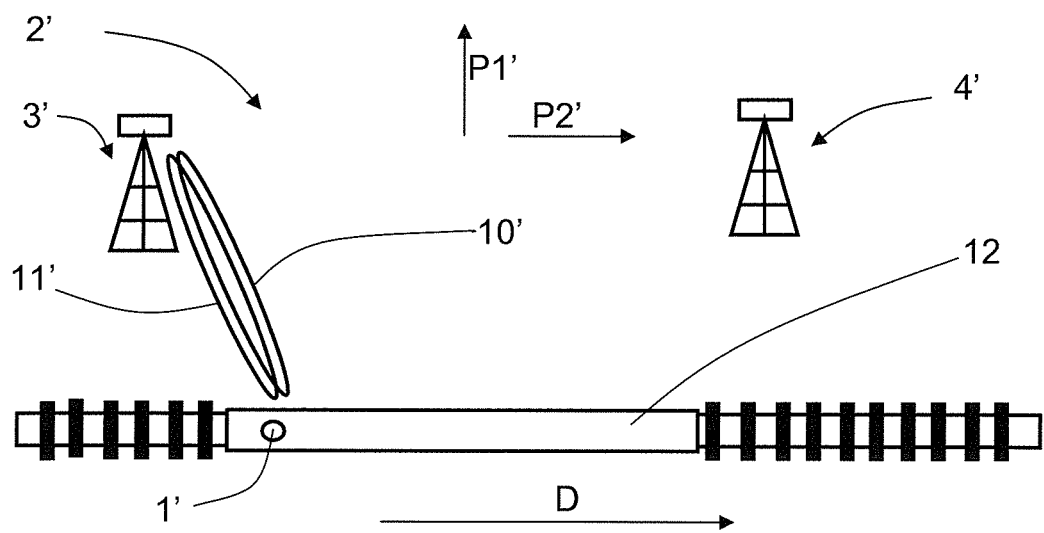
FIG. 5 schematically shows a repeater/relay mounted to a moving train in a first mode of operation.

In a second example, with reference to FIG. 5, an intermediate node 1' is arranged at a train 12 and is comprised in a wireless communication network 2'. The intermediate node 1' is arranged to relay information between a first donor node 3' and at four served nodes in the form of user terminals in the train (not shown).

The intermediate node 1 is adapted to communicate with the first donor node 3' by means of a first antenna radiation lobe 10' and a second antenna radiation lobe 11', where the antenna radiation lobes 10', 11' are electrically steerable in the same way as in the first example. For this purpose, the intermediate node 1' has a not shown antenna arrangement similar to the one in the first example.

Figure 6:
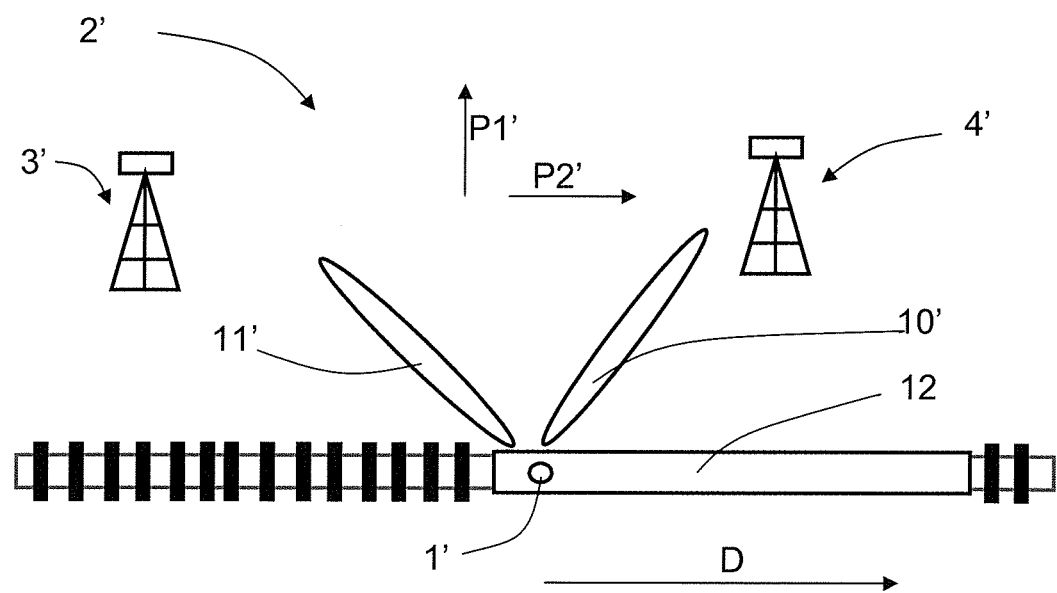
FIG. 6 schematically shows a repeater/relay mounted to a moving train in a second mode of operation.
Figure 7:
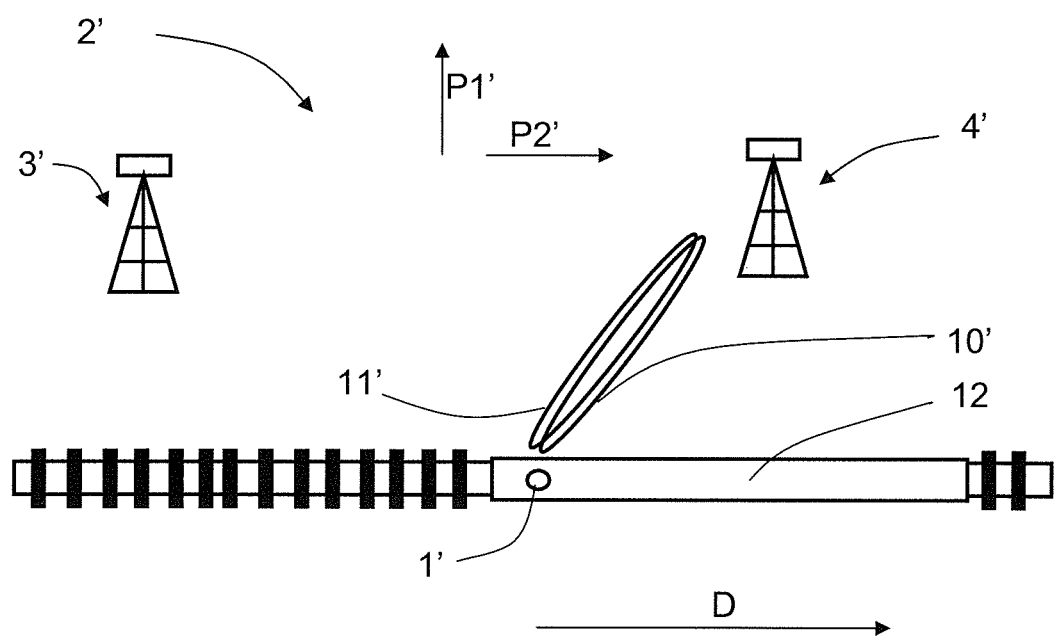
FIG. 7 schematically shows a repeater/relay mounted to a moving train in a third mode of operation.

A corresponding first mode of operation, second mode of operation and third mode of operation are shown in FIG. 5, FIG. 6 and FIG. 7, as the train 12 travels in a direction D along its track and the first donor node 3' is exchanged with a second donor node 4' by means of handover.

In accordance with the present invention, also in this example, the intermediate node 1' is arranged for communicating by means of a first polarization P1' and a second polarization P2'. The first polarization P1' is associated with the first antenna radiation lobe 10', and the second polarization P2' is associated with the second antenna radiation lobe 11'.

For example, more in detail, the intermediate node 1 may here be constituted by a mobile relay 1' with dual polarized reconfigurable antennas, the mobile relay 1' being placed on the train 12. In FIG. 5, the antenna radiation lobes 10', 11' are pointing at the first donor node 3' due to that the mobile relay 1' is closest to this node which may be constituted by a base station. As the train 12 moves along the railway in the direction D, the distance to the first donor node 3' becomes larger, and the distance to the second donor node 4' becomes shorter.

In FIG. 6, the mobile relay 1' has about the same distance to the first donor node 3' and the second donor node 4'. Now, the mobile relay 1' starts the process of changing donor base station. If the antenna radiation lobes 10', 11' of both polarizations would be re-directed from the first donor node 3' to the second donor node 4' at the same time, the handover for the relay from the first donor node 3' to the second donor node 4' would be difficult. Therefore, the first antenna radiation lobe 10' is first re-directed as shown in FIG. 6. Now a handover for the mobile relay 1' from the first donor node 3' to the second donor node 4' can be made. When the handover is made, also the antenna radiation lobe 10' is re-directed from the first donor node 3' to the second donor node 4'.

As disclosed in the two examples above, the antenna radiation lobes 10, 11; 10', 11' may be directed independent of each other, and interference between the two antenna radiation lobes 10, 11; 10', 11' is reduced since different polarizations and possibly different radio chains may be used.

Generally, the basic concept of the invention is to make a smooth change of donor nodes such as donor base stations for repeaters and relays by using a reconfigurable antenna 9 at the intermediate node 1, 1'. The smooth change could be made by first re-directing the beam of the first polarization P1, P1' from the current donor base station 3, 3' towards the new donor base station 4, 4'. Then the intermediate node 1, 1' has a good connection with both base stations 3, 3'; 4, 4' and therefore handovers could be made. After the handovers are made, the beam of the second polarization P2, P2' is also re-directed from the current donor base station 3, 3' to the new donor base station 4, 4'.

The handover indication can be determined by the current donor base station in the current cell, or by intermediate node 1, 1' itself.

The intermediate node 1, 1' may regularly use the first antenna radiation lobe 10, 10' to search for candidate base stations in candidate cells in order to evaluate whether there is a suitable second donor node. The search can either be made by finding an optimal beam former considering the direction to candidate cells, or by evaluating a number of alternative antenna radiation lobes. The intermediate node 1, 1' is considered ready for handover when a candidate cell constitutes a relevant cell with adequate radio conditions including the antenna gains. Antenna gains may include such features as the possibility of beamforming. This may be performed in several different ways: (A) based on localization of the intermediate node 1, 1', also benefitting from repetitive behavior. At a specific estimated location, the intermediate node 1, 1' acquires an indication that a handover is possible and initiates an alternative antenna radiation lobe evaluation. The localization could either be based on GPS (Global Positioning System), or on RF (Radio Frequency) fingerprinting; a combination of detected cells indicate a crude position estimate; (B) based on past handover failure and radio link failure statistics in the donor base station 3, 3' or intermediate node 1, 1' for specific cell transitions, typically for the repetitive behavior of trains, buses etc. If a past handover indication was considered too late to enable all user terminals 5, 6, 7, 8 to complete the handover and causing handover failures, then the handover is indicated more early the next time being served by the same cell; (C) based on information about handover statistics and possibly also localization from prior handovers but by other trains/buses/vehicles. Such information can be aggregated and conveyed to the intermediate node 1, 1' by the donor base station 3, 3', other radio access nodes such as an RNC (Radio Network Controller), a core network node, or an operation and maintenance node.

The intermediate node 1, 1' is thus arranged to include statistics regarding past changes of donor node when performing said evaluation. For example, a first vehicle and a second vehicle may pass the donor nodes A, B, C and D in this order, the first vehicle passing the donor nodes before the second vehicle. When considering the transition from donor node C to donor node D for the second vehicle when the first vehicle has passed all the donor nodes A, B, C and D, there are two main alternatives for said past changes: (A) taking the transition between donor node C and D for the first vehicle into account; (B) taking the transition between donor node B and C for the second vehicle into account.

Alternative (1) above is the one of main interest, but of course alternative (2) may be of interest as well, since previous handovers for a certain vehicle also comprises information. A combination of these alternatives is of course also conceivable.

Furthermore, other alternatives may include earlier transitions for both vehicles, for example the transition between donor node B and C for the first vehicle and the transition between donor node A and B for the first vehicle, even if these alternatives probably comprises less useful information the first two alternatives above.

The reconfigurable antenna 9 is configured to enable long enough handover transition time in order to complete a group handover. The time from a handover indication to a handover complete indication can be one out of, or a combination of the following (A)-(E):

(A) Pre-determined time, based on handover time information. The handover time information could be determined in the donor base station 3, 3' and signaled to the intermediate node 1, 1' or be determined in the intermediate node 1, 1' itself.

(B) Based on train velocity, possibly estimated by the intermediate node 1, 1' using dedicated sensor and circuitry, or estimated from the rate of variation in the wireless radio channel, e.g. via Doppler shift or Doppler spread estimates.

(C) Based on past handover failure statistics and radio link failure in the donor base station or intermediate node 1, 1' for specific cell transitions, typically for the repetitive behavior of trains, buses etc. If a past handover time was considered too short to enable all user terminals 5, 6, 7, 8 to complete the handover and causing handover failures, then the handover time is prolonged the next time passing the same cell to cell crossing.

(D) Based on localization of the intermediate node 1, 1', also benefitting from repetitive behavior. At a specific estimated location, the intermediate node 1, 1' discloses a handover complete indication. The localization could either be based on GPS, or on RF fingerprinting; a combination of detected cells indicate a crude position estimate.

(E) Based on information about handover statistics and possibly also localization from prior handovers but by other trains/buses/vehicles. Such information can be aggregated and conveyed to the intermediate node 1, 1' by the donor base station, other radio access node such as an RNC, a core network node, or an operation and maintenance node.

The respective antenna radiation lobes for the served antenna arrangement 9 can for example be generated by monitoring the downlink direction of the serving, donor, base stations and candidate base stations with help of for example DOA estimation. Antenna radiation lobes targeting candidate base stations could also be selected from a number of fixed antenna radiation lobes, each regularly evaluated.

The antenna radiation lobes can also be generated based on information about handover statistics, generated antenna radiation lobes and possibly also localization from prior handovers, but by other trains/buses/vehicles. Such information can be aggregated and conveyed to the intermediate node 1, 1' by the donor base station, other radio access node such as an RNC, a core network node, or an operation and maintenance node.

Figure 8:
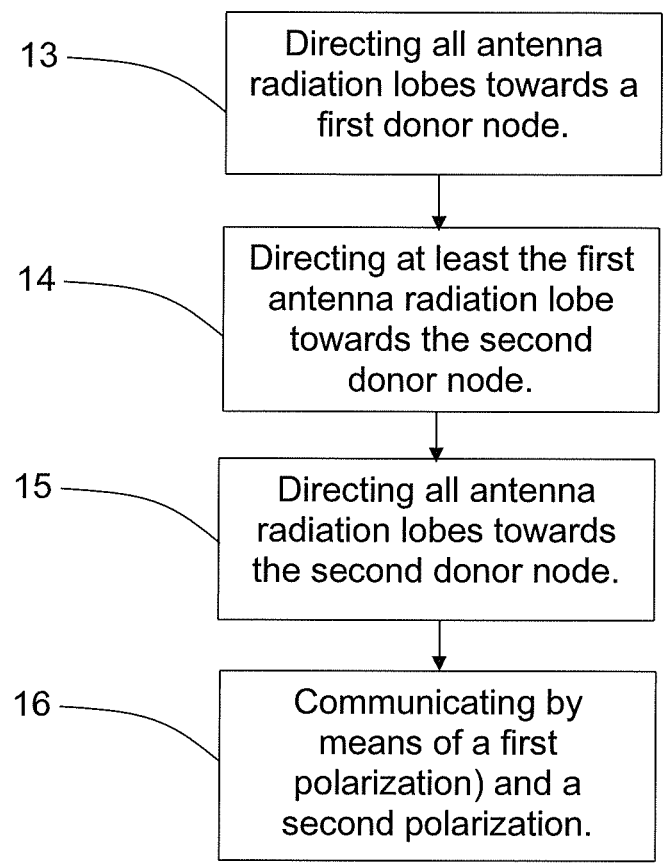
FIG. 8 schematically shows a flow chart of a method according to the present invention.

With reference to FIG. 8, the present invention also relates to a method for changing a first donor node 3, 3' to a second donor node 4, 4' for an intermediate node 1, 1' in a wireless communication network 2, 2'. The intermediate node 1, 1' is used to relay information between donor nodes 3, 4; 3', 4' and at least one served node 5, 6, 7, 8. The intermediate node 1, 1' communicates with each donor node 3, 4; 3', 4' by means of at least a first antenna radiation lobe 10, 10' and a second antenna radiation lobe 11, 11', the antenna radiation lobes 10, 11; 10', 11' being electrically steerable. The method comprises the steps: (13) during a first mode of operation, directing all antenna radiation lobes (10µ, 11; 10', 11' towards a first donor node 3, 3'; (14) during a second mode of operation, following the first mode of operation, when the first donor node 3, 3' is going to be exchanged with a second donor node 4, 4' by means of handover, directing at least the first antenna radiation lobe 10, 10' towards the second donor node 4, 4' and maintaining at least the second antenna radiation lobe 11, 11' directed towards the first donor node 3', such that, during the second mode of operation, the intermediate node 1, 1' is in contact with both the first donor node 3, 3 and the second donor node 4, 4' during handover procedures for the first donor node 3, 3' and the second donor node 4, 4', and (15) during a third mode of operation, corresponding to the first mode of operation, directing all antenna radiation lobes 10, 11; 10', 11' towards the second donor node 4, 4'.

The method further comprises the step of: (16) communicating by means of a first polarization P1 and a second polarization P2, the first polarization being associated with each antenna radiation lobe 10, 10' directed towards the second donor node 4, 4' during the second mode of operation and the second polarization P2 being associated with each antenna radiation lobe 11, 11' directed towards the first donor node 3, 3' during the second mode of operation.

The present invention is not limited to the above, but may vary freely within the scope of the appended claims. For example, the antenna radiation lobes 10, 11; 10', 11' may be electrically steerable by means of either analogue control or digital control.

Furthermore, the number of antenna radiation lobes may vary, but there is at least two antenna radiation lobes, where, generally, during the first mode of operation, the served antenna arrangement 9 is adapted to direct all antenna radiation lobes 10, 11; 10', 11' towards a first donor node 3, 3', and where, during the second mode of operation, the served antenna arrangement 9 is adapted to direct at least the first antenna radiation lobe 10, 10' towards the second donor node 4, 4' and to maintain at least the second antenna radiation lobe 11, 11' directed towards the first donor node 3, 3'. Furthermore, during the third mode of operation, the served antenna arrangement 9 is adapted to direct all antenna radiation lobes 10, 11; 10', 11' towards the second donor node 4, 4'.

The first polarization P1 is thus associated with each antenna radiation lobe 10, 10' directed towards the second donor node 4, 4' during the second mode of operation, and the second polarization P2 is associated with each antenna radiation lobe 11, 11' directed towards the first donor node 3, 3' during the second mode of operation.

The polarizations have mutually separate directions, and are for example mutually orthogonal. The term orthogonal is not to be interpreted as a mathematical exact term, but to be within the limits of what is practically obtainable.

As an auxiliary example, not being comprised in the present claims, instead of re-directing the pointing directions of the antenna radiation lobes, it is instead conceivable that the polarizations of the antenna radiation lobes are changed, possibly in combination with re-direction of the pointing direction. Thus certain antenna radiation lobe characteristics may be directed towards the donor nodes during the different modes of operation described previously, where those antenna radiation lobe characteristics may be antenna radiation lobe pointing direction and/or antenna radiation lobe polarization.

The invention claimed is:

1. An intermediate node in a wireless communication network, the intermediate node being arranged to relay information between a donor node and at least one served node, the intermediate node comprising:

a served antenna arrangement that is adapted to communicate with each donor node by means of at least a first antenna radiation lobe and a second antenna radiation lobe, wherein the antenna radiation lobes are electrically steerable and the intermediate node is configured such that: (a) during a first mode of operation, the served antenna arrangement is adapted to direct the first and second antenna radiation lobes towards a first donor node, (b) during a second mode of operation, following the first mode of operation, when the first donor node has been determined to be exchanged with a second donor node by means of handover, the served antenna arrangement is adapted to direct at least the first antenna radiation lobe towards the second donor node and to maintain at least the second antenna radiation lobe directed towards the first donor node such that, during the second mode of operation, the intermediate node is in contact with both the first donor node and the second donor node during hand-over procedures for the first donor node and the second donor node, and (c) during a third mode of operation, corresponding to the first mode of operation, the served antenna arrangement is adapted to direct the first and second antenna radiation lobes towards the second donor node, and the served antenna arrangement is arranged to communicate by means of a first polarization and a second polarization, the first polarization being associated with each antenna radiation lobe directed towards the second donor node during the second mode of operation and the second polarization being associated with each antenna radiation lobe directed towards the first donor node during the second mode of operation.

2. The intermediate node according to claim 1, wherein the antenna radiation lobes are electrically steerable by means of either analogue control or digital control.

3. The intermediate node according to claim 1, wherein the intermediate node is a repeater or a relay.

4. The intermediate node according to claim 1, wherein said served node comprises a user terminal.

5. The intermediate node according to claim 1, wherein the intermediate node is arranged to evaluate whether there is a suitable second donor node.

6. The intermediate node according to claim 5, wherein the intermediate node is arranged to take antenna gains into account when performing said evaluation.

7. The intermediate node according to claim 6, wherein the intermediate node is arranged to include statistics regarding past changes of donor node when performing said evaluation.

8. The intermediate node according to claim 1, wherein the intermediate node is positioned either at a vehicle, or in vehicle.

9. A method for changing a first donor node to a second donor node for an intermediate node in a wireless communication network, the intermediate node being used to relay information between donor nodes and at least one served node, the intermediate node communicating with each donor node by means of at least a first antenna radiation lobe and a second antenna radiation lobe, the antenna radiation lobes being electrically steerable, the method comprising:

during a first mode of operation, directing the first and second antenna radiation lobes towards a first donor node;

during a second mode of operation, following the first mode of operation, when the first donor node is going to be exchanged with a second donor node by means of handover, directing at least the first antenna radiation lobe towards the second donor node and maintaining at least the second antenna radiation lobe directed towards the first donor node, such that, during the second mode of operation, the intermediate node is in contact with both the first donor node and the second donor node during handover procedures for the first donor node and the second donor node;

during a third mode of operation, following the second mode of operation, directing the first and second antenna radiation lobes towards the second donor node; and communicating by means of a first polarization and a second polarization, the first polarization being associated with each antenna radiation lobe directed towards the second donor node during the second mode of operation and the second polarization being associated with each antenna radiation lobe directed towards the first donor node during the second mode of operation.

10. The method according to claim 9, wherein the intermediate node is used for evaluating whether there is a suitable second donor node.

11. The method according to claim 10, wherein the intermediate node uses antenna gains when performing said evaluation.

12. The method according to claim 10, wherein the intermediate node uses statistics regarding past changes of donor node when performing said evaluation.

13. The method according to claim 9, wherein the intermediate node is used either at a vehicle, or in vehicle.

* * * * *

UNITED STATES PATENT AND TRADEMARK OFFICE
CERTIFICATE OF CORRECTION

PATENT NO. : 8,447,307 B2  
APPLICATION NO. : 13/396838  
DATED : May 21, 2013  
INVENTOR(S) : Nilsson et al.

Page 1 of 1

It is certified that error appears in the above-identified patent and that said Letters Patent is hereby corrected as shown below:

In the Specification

In Column 8, Line 67, delete "(10μ," and insert -- (10, --, therefor.

Signed and Sealed this
Eighth Day of October, 2013

Teresa Stanek Rea
*Deputy Director of the United States Patent and Trademark Office*